United States Patent [19]
Hashiba

[11] Patent Number: 5,478,965
[45] Date of Patent: Dec. 26, 1995

[54] FUSED CHIP-TYPE SOLID ELECTROLYTIC CAPACITOR AND FABRICATION METHOD THEREOF

[75] Inventor: Shiroh Hashiba, Toyama, Japan

[73] Assignee: NEC Corporation, Japan

[21] Appl. No.: 190,254

[22] Filed: Feb. 1, 1994

[30] Foreign Application Priority Data

Feb. 2, 1993 [JP] Japan .................................. 5-015116

[51] Int. Cl.[6] ..................................................... H01G 9/15
[52] U.S. Cl. ......................................... 29/25.03; 361/534
[58] Field of Search ...................... 29/25.03; 361/275.4, 361/534, 523, 528, 529, 532, 533, 540

[56] References Cited

U.S. PATENT DOCUMENTS

| | | | |
|---|---|---|---|
| 3,178,622 | 4/1965 | Paul et al. | 361/275.4 |
| 3,225,276 | 12/1965 | Daniels | 361/275.4 |
| 4,107,762 | 8/1978 | Shim et al. | 361/534 |
| 4,814,946 | 3/1989 | Su | 361/534 |

FOREIGN PATENT DOCUMENTS

| | | | |
|---|---|---|---|
| 1-117313 | 5/1989 | Japan | 361/534 |
| 2-105513 | 4/1990 | Japan | 361/534 |
| 2-106028 | 4/1990 | Japan | 361/534 |
| 2-106030 | 4/1990 | Japan | 361/534 |
| 4-192406 | 7/1992 | Japan | 361/275.4 |

*Primary Examiner*—Teresa J. Walberg
*Assistant Examiner*—Gregory L. Mills
*Attorney, Agent, or Firm*—Laff, Whitesel, Conte & Saret, Ltd.

[57] ABSTRACT

A fused chip-type solid electrolytic capacitor in which a fuse is difficult to be cut and broken down during its fabrication sequence. The capacitor includes a capacitor element having an anode lead and a cathode layer, an anode terminal fixed to the anode lead, a fuse electrically connected to the cathode layer, a cathode terminal electrically connected to said cathode layer through said fuse; and a resin sheathing for entirely covering said capacitor element. The fuse is formed of a piece of a metallized plastic film and is mechanically bonded to the cathode terminal to the cathode layer by a first and second electrically conductive materials, respectively. The metallized plastic tape is preferably formed of a plastic base film and a metal layer deposited on the base film, and the metal layer is mechanically bonded to the cathode terminal by the first electrically conductive material and to the cathode layer by the second electrically conductive material.

1 Claim, 3 Drawing Sheets

FUSED CHIP-TYPE SOLID ELECTROLYTIC CAPACITOR AND FABRICATION METHOD THEREOF

BACKGROUND OF THE INVENTION

1. Field of the Invention

The present invention relates to a fused chip-type solid electrolytic capacitor and more particularly, to a fused chip-type solid electrolytic capacitor in which a piece of a metallized plastic tape is employed as a fuse and a fabrication method of the same.

2. Description of the Prior Art

A solid electrolytic capacitor, which is used in various electronic circuits, has an advantage because there is a small failure or break-down rate. However, the capacitor tends to become short-circuited once a failure occurs, and there is a possibility that the capacitor element is burned out due to heat generated by a large short-circuit current. Therefore, the capacitor element must not become short-circuited even if any failure occurs in order to prevent the capacitor from being burned out due to an excessive short-circuit current as well as to protect electronic devices and/or elements adjacent to the capacitor.

In response to the above requirement, conventionally, a solid electrolytic capacitor containing a built-in fuse was developed and has been used. An example of such a conventional fused chip-type solid electrolytic capacitors is shown in FIG. 1.

In FIG. 1, the conventional capacitor has a capacitor element 21 in a form of a rectangular parallelopiped. An anode lead 22 is formed to protrude from the top of the element 21. A bottom end of an anode terminal 24 is fixed to the end of the anode lead 22 by welding. A cathode layer 25 is formed to cover the side face and bottom of the element 21.

There is provided with a fuse 31 made of a piece of a low melting-point alloy wire which is 0.1 to 0.2 mm in diameter. One end of the fuse 31 is connected by a solder 32b to the cathode layer 25 at the side face of the element 21. The other end of the fuse 31 is connected by a solder 32a to a bottom end of a cathode terminal 23 at the side face of the element 21. A piece of a heat-resistant insulation film or tape 33 partially covers the bottom and side face of the element 21 to ensure an electrical insulation between the cathode terminal 23 and the cathode layer 25.

The capacitor element 21, the anode lead 22, the fuse 31 and the insulation film 33 are entirely covered with a resin sheathing 29 of a rectangular parallelopiped. The anode terminal 24 and the cathode terminal 23 are partially protruding from the sheathing 29. The sheathing 29 is formed by molding.

With the conventional fused chip-type solid electrolytic capacitor, the cathode terminal 23 and the cathode layer 25 of the capacitor element 21 are electrically connected by the slender fuse 31 made of a low melting-point alloy wire, so that the element 21 cannot be retained sufficiently after a connection of the anode terminal 24 to the anode lead 22 during its fabrication sequence.

Therefore, the element 21 readily deviates in position due to positional shifts of lead frames for the anode and cathode terminals 24 and 23. As a result, is a problem because the fuse 31 is cut and/or melted down due to heat of soldering.

SUMMARY OF THE INVENTION

An object of the present invention is to provide a fused chip-type solid electrolytic capacitor in which a fuse is difficult to be cut and broken during its fabrication sequence and a fabrication method of the same.

Another object of the present invention is to provide a fused chip-type solid electrolytic capacitor in which electrical connections of the fuse are improved and a fabrication method of the same.

A fused chip-type solid electrolytic capacitor according to the present invention includes a capacitor element having an anode lead and a cathode layer, an anode terminal fixed to the anode lead, a fuse electrically connected to the cathode layer, a cathode terminal electrically connected to said cathode layer through said fuse; and a resin sheathing for entirely covering said capacitor element.

The fuse is formed of a piece of metallized plastic film. The fuse is mechanically bonded to the cathode terminal by a first electrically conductive material and to the cathode layer by a second electrically conductive material.

With the fused chip-type solid electrolytic capacitor of the present invention, the fuse is made of the metallized plastic film, so that the fuse has a mechanical strength which is greater than the mechanical strength in the conventional capacitor. Therefore, the capacitor element is very difficult to move in position even if there are positional shifts of lead frames for the anode and cathode terminals during its fabrication sequence.

As a result, the fuse is extremely difficult to be cut or broken during its fabrication processes, such as during a molding of one of the sheathing. Also, electrical connections of the fuse are improved.

In addition, the melting temperature of the electrically conductive materials are lower than the melting temperatures of solders, so that there is no possibility that the fuse melts down due to heat of soldering.

The metallized plastic film may be made by any suitable metallization process such as evaporation, physical vapor deposition (PVD) or the like.

The plastic film may be made of any electrical insulator such as Mylar and polyamide or the like. The metal to be deposited on the base film may be tin (Sn) and zinc (Zn) or the like.

The first and second electrically conductive materials may be any material if it has a melting temperature which is lower than the melting temperature of solders, for example, a silver paste.

In a preferred embodiment, the fuse is formed of a plastic base film and a metal layer deposited on a surface of the base film. The metal layer is mechanically bonded to the cathode terminal by the first electrically conductive material and to the cathode layer by the second electrically conductive material.

In another preferred embodiment, an insulation film is formed on the cathode layer. A bottom part of the cathode terminal is in contact with the insulation film, and the metal layer is bonded to the bottom part by the first electrically conductive material. The second electrically conductive material is in contact with the cathode layer at an uncovered area of the cathode layer, and the metal layer is bonded to the cathode layer by the second electrically conductive material.

In still another preferred embodiment, the metal layer has a trimming pattern for adjusting its electric current value.

A fabrication method of a fused chip-type solid electrolytic capacitor, according to the present invention, comprises the steps of forming a capacitor element having an anode lead and a cathode layer, fixing an anode terminal to the anode lead, mechanically bonding a fuse to electrically connect to the cathode layer, electrically connecting a cathode terminal to the cathode layer through the fuse, and forming a resin sheathing for entirely covering the capacitor element, anode lead and fuse.

The fuse is formed of a piece of a metallized plastic film. The fuse is mechanically bonded to the cathode terminal by a first electrically conductive material and to the cathode layer by a second electrically conductive material.

In a preferred embodiment, a step of trimming the metal layer for adjusting its electric current value is provided after the step of bonding a fuse mechanically.

DETAILED DESCRIPTION OF THE PREFERRED EMBODIMENTS

First Embodiment

Figure 1A:
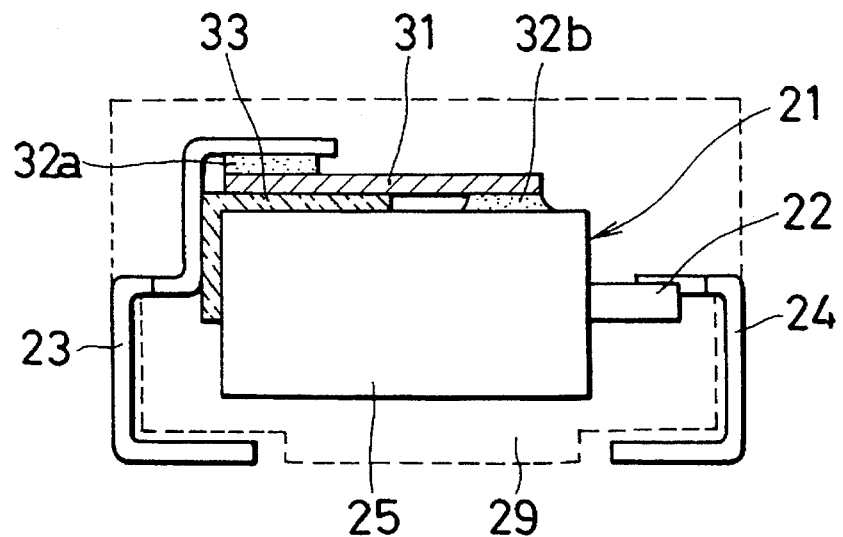
FIG. 1A is a cross sectional view of a conventional fused chip-type solid electrolytic capacitor.

Preferred embodiments of the present invention will be described below referring to the drawing figures attached.

Figure 2A:
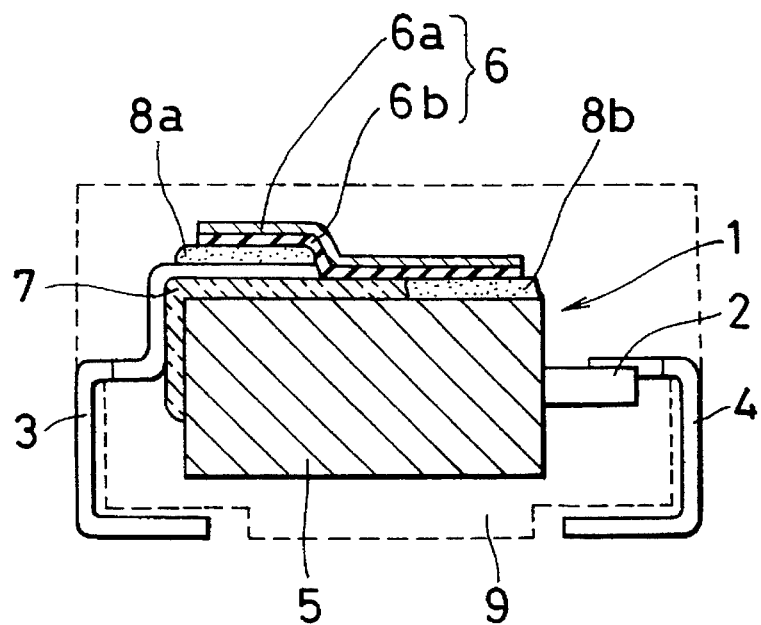
FIG. 2A is a cross sectional view of a fused chip-type solid electrolytic capacitor according to a first embodiment of the present invention.
Figure 2B:
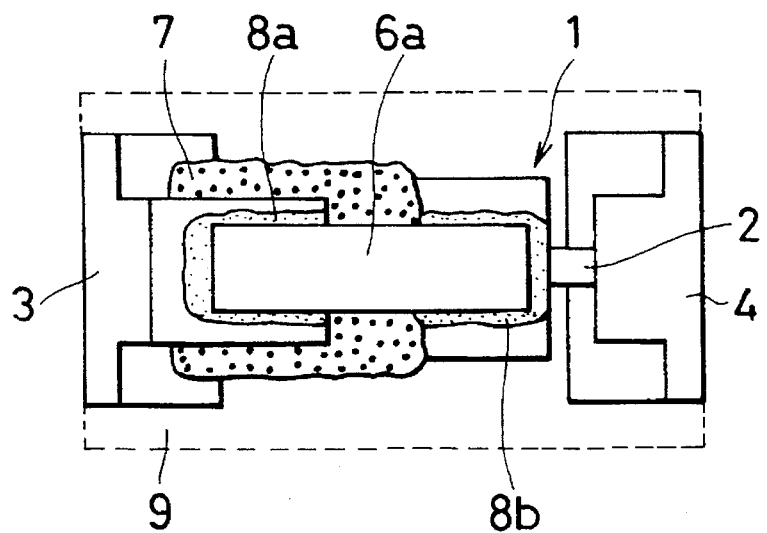
FIG. 2B is a plan view of the fused chip-type solid electrolytic capacitor shown in FIG. 2A.

FIGS. 2A and 2B show a fused chip-type solid electrolytic capacitor of a first embodiment. In FIGS. 2A and 2B, the capacitor has a capacitor element 1 of a rectangular parallelopiped. An anode lead 2 is formed to protrude from the top of the element 1. A bottom end of an anode terminal 4 is fixed to the end of the anode lead 2 by welding. A cathode layer 5 is formed to cover entirely the side face and bottom of the element 1.

The capacitor element 1 contains a sintered anode body of a metal having a valve action such as tantalum and aluminum, anodic-oxide film formed on the surface of the anode body, a manganese dioxide film formed on the anodic-oxide film, a carbon film formed on the manganese dioxide film, and a silver paste film formed on the carbon film. The silver paste film acts as the cathode layer 5.

A fuse 6 is made of a rectangular piece of a metallized plastic film or tape along the longitudinal dimension of the capacitor element 1. One end of the fuse 6 is bonded by an electrically conductive material or adhesive 8b to the cathode layer 5 at the side face of the element 1. The other end of the fuse 6 is connected by an electrically conductive material or adhesive 8a to a bottom end of a cathode terminal 3 at the side face of the element 1.

The anode lead 2 is made of a metal wire such as tantalum and aluminum. The anode and cathode terminals 4 and 3 are both made of metal plates of good electrical conductivity.

A piece of a heat-resistant insulation film or tape 7 covers partially the bottom and side face of the capacitor element 1 to ensure electrical insulation between the cathode terminal 3 and the cathode layer 5. The bottom portion (bent like an "L") of the cathode terminal 3 is in contact with the insulator film 7.

The fuse 6 is made of a piece of a plastic base film 6a and a metal layer 6b deposited on the entire surface of the base film 6a. Here, the plastic base film 6a is made of a rectangular (0.5 μm×1 mm) Mylar film whose thickness is 20 μm, and the metal layer 6b is made of a tin layer whose thickness is 20 nm. Also, silver paste is used as the electrically conductive adhesives 8a and 8b, and a polyamide film is used as the piece of the heat-resistant insulation film or tape 7.

As shown in FIGS. 2A and 2B, the metal layer 6b of the fuse 6 is placed so as to face the cathode layer 5. In other words, the metal layer 6b is placed at the near side of the capacitor element 1. The plastic base film 6a of the fuse 6 is placed at the opposite or far side of the capacitor element 1.

The capacitor element 1, the anode lead 2, the fuse 6 and the insulation film 7 are entirely covered with a rectangular parallelopiped sheathing 9 made of epoxy resin. A large part of the anode terminal 4 and a half of the cathode terminal 3 are protruding from the sheathing 9 to be bent like "L" characters along the surface of the sheathing 9.

The rectangular parallelopiped sheathing 9 is, for example, 2 mm in width, 3 mm in length and 2 mm in height.

Next, a fabrication method of the capacitor described above is shown below.

A powder of metal having a valve action such as tantalum or aluminum is on to the rectangular parallelopiped shape and is sintered in vacuum, resulting in the anode body with the anode lead 2 inserted in the top of the anode body.

The anode body is then subjected an anodic oxidation to form the anodic-oxide film of the metal on the surface of the anode body. The manganese dioxide film is formed on the anodic-oxide film, the carbon film is formed on the manganese dioxide film, and the cathode layer 5 made of silver paste is formed on the carbon film.

Figure 1B:
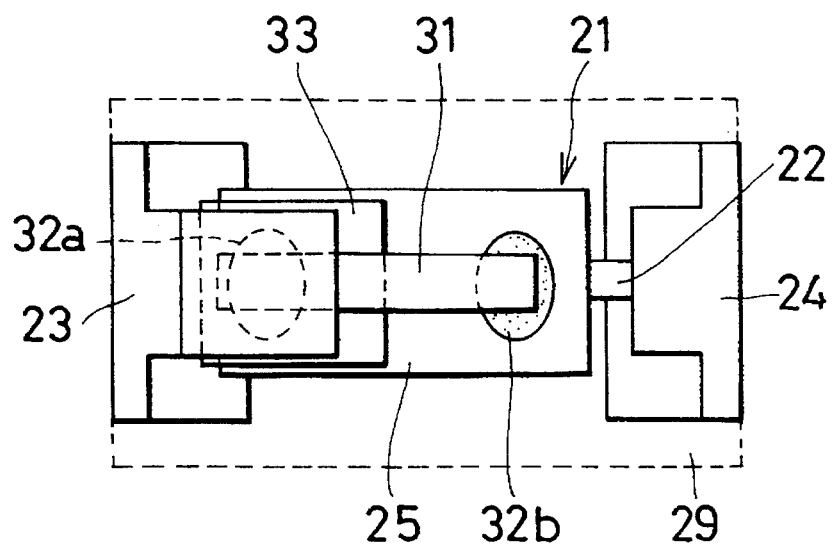
FIG. 1B is a plan view of the conventional fused chip-type solid electrolytic capacitor shown in FIG. 1A.

The anode terminal 4 is then fixed to the end of the anode lead 2 by welding. Thus, the capacitor element 1 as shown in FIGS. 1A and 1B is completed.

Subsequently, an insulation resin is applied to the side face and the bottom of the capacitor element 1 to form the insulation film 7. As shown in FIGS. 2A and 2B, the film 7 covers the surface area of the element 1 in which there is a possibility that the bottom portion of the cathode terminal 3 is in contact therewith, so that the film 7 has an cross-section L-shaped.

The bottom portion of the cathode terminal 3, which is bent into an L-shaped "L", is placed and retained on the insulation film 7 so that the corner of the bottom portion engages with the corner of the film 7.

Next, the electrically conductive adhesive 8a, such as silver paste, is applied on the bottom portion of the cathode terminal 3. On the other hand, the electrically conductive adhesive 8b, such as silver paste, is applied on the uncovered area of the cathode layer 5 at the side face of the capacitor element 1. The adhesive 8a is not in contact with the insulation film 7 and the adhesive 8b is in contact with the insulation film 7.

The fuse 6 is attached to the capacitor element 1 by using the electrically conductive adhesives 8a and 8b. As shown in FIGS. 2A and 2B, the metal layer 6b of the fuse 6 is opposite to the cathode layer 5. It is mechanically bonded and electrically connected to the cathode layer 5 and the cathode terminal 3 by the adhesives 8a and 8b at each end of the metal layer 6b, respectively. The surface of the metal layer 6b is in substantial contact with the insulation film 7, except for the bonded ends thereof. Thus, the cathode layer 5 and the cathode terminal 3 become linked together through the fuse 6.

With the fused chip-type solid electrolytic capacitor of the first embodiment, asdescribed above, the fuse 6 is made of the plastic base film 6a and the metal layer 6b deposited thereon, so that the fuse 6 has a mechanical strength which is greater than the mechanical strength of the conventional capacitor shown in FIGS. 1A and 1B. Therefore, the capacitor element 1 is very difficult to move in position even if there are positional shifts of lead frames for the anode and cathode terminals 4 and 3.

As a result, the fuse 6 is extremely difficult to be cut or broken during its fabrication processes such as molding one of the sheathing 9. This means that there is an additional advantage because the molding process of the sheathing 9 is easy to be automated.

Also, no solder is used because electrical conductive adhesives 8a and 8b, which melt at a temperature that is lower than the melting temperature of solders, are used for bonding the fuse 6, so that there is no possibility that the fuse 6 melts down due to the heat of soldering.

The mechanical strength of the fuse 6 can be changed appropriately by changing its size such as the thickness, width and length and/or material of the plastic base film 6a. Similarly, the melting temperature of the fuse 6 can be changed appropriately by changing the size and/or material of the metal layer 6b.

To confirm the effects or advantages of the capacitor of the present invention, the capacitors of the first embodiment and those of the prior art shown in FIGS. 1A and 1B were fabricated. Ten thousand of the capacitors were fabricated for each of the first embodiment and the prior art. The number of the capacitors in which the fuse was broken and those in which the anode and/or cathode terminal was exposed from the resin sheathing were counted.

As a result, the "break down rate of the fuse" and the "fault exposure rate of the anode and/or cathode terminals" were obtained as shown in Table 1.

TABLE 1

|  | BREAK DOWN RATE OF FUSE | FAULT EXPOSURE RATE OF ANODE AND/OR CATHODE TERMINALS |
|---|---|---|
| FIRST EMBODIMENT | 0% | 0.2% |
| PRIOR ART | 1.8% | 1.0% |

It is seen from Table 1 that the fused chip-type solid electrolytic capacitor of the first embodiment is superior in both of the break down rate of the fuse and the fault exposure rate of the anode and/or cathode terminal to that of the prior art.

Second Embodiment

Figure 3A:
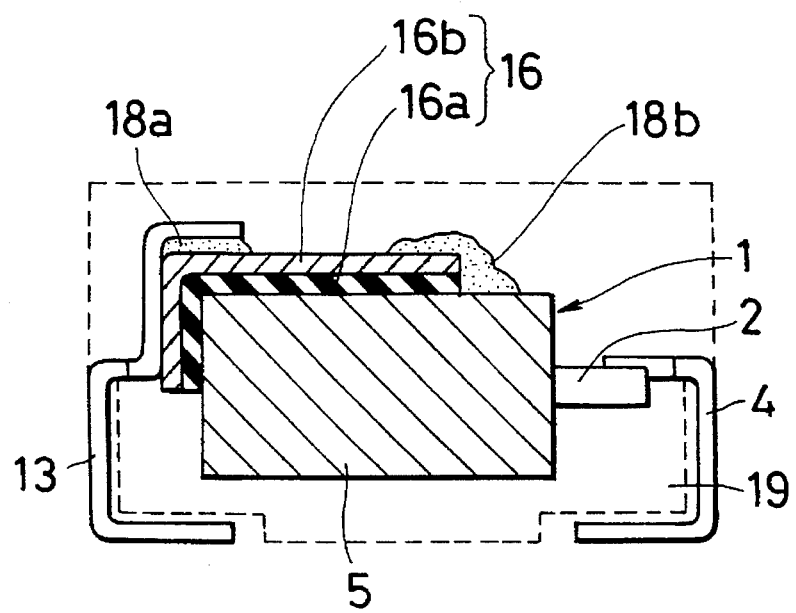
FIG. 3A is a cross sectional view of a fused chip-type solid electrolytic capacitor according to a second embodiment of the present invention.
Figure 3B:
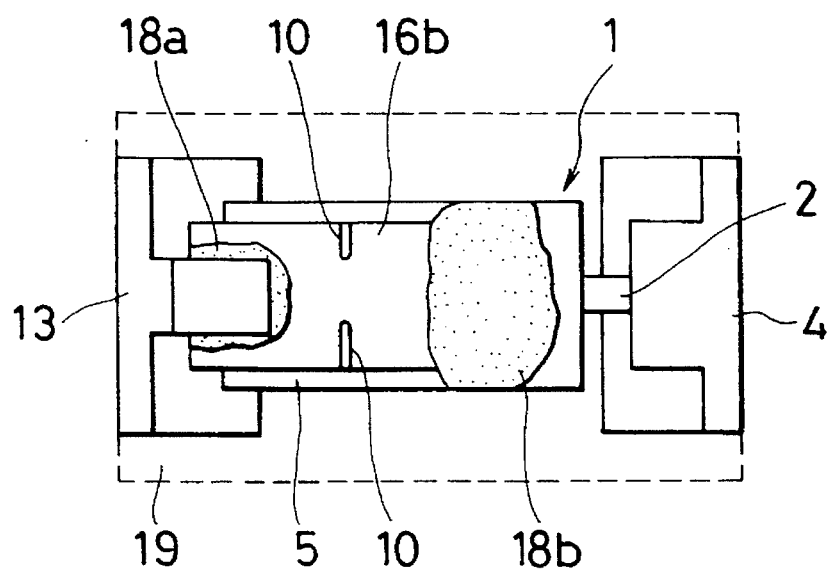
FIG. 3B is a plan view of the fused chip-type solid electrolytic capacitor shown in FIG. 3A.

FIGS. 3A and 3B show a fused chip-type solid electrolytic capacitor of a second embodiment, which is the same in structure as that of the first embodiment excepting that the fuse is attached to the capacitor element upside down. Therefore, the description of the same structure is omitted here for the sake of simplification of explanation.

In the second embodiment, the advantages are the same as those of the first embodiment.

As shown in FIGS. 3A and 3B, there is a rectangular fuse 16 along the longitudinal dimenison of the rectangular parallelopiped element 1. The fuse 16 is made of a rectangular piece of a plastic base film 16a and a metal layer 16b deposited on the entire surface of the base film 16a. Here, the plastic base film 16a is made of a Mylar film and the metal layer 16b is made of a tin layer. Also, silver paste is used as the electrically conductive materials or adhesives 18a and 18b.

Different from the first embodiment, the plastic base film 16a is placed thereof. It to the cathode layer 5 of the capacitor element 1, in other words, the base film 16a is placed at the near side of the element 1. The metal layer 16b is placed at the opposite or far side of the element 1.

Further, the fuse 16 is formed not only on the side face of the element 1 but also on the bottom thereof and it covers the area on which the insulation film 7 is formed in the first embodiment.

Therefore, the plastic base film 16a acts as the insulation film 7 for ensuring an electrical insulation between the cathode terminal 3 and the cathode layer 6. As a result and an additional advantage, the heat-resistant insulation film 7 in the first embodiment is not required.

One end of the fuse 16 is mechanically bonded and electrically connected by an electrically conductive adhesive 18b to the cathode layer 5 at the uncovered side face of the element 1. The other end of the fuse 16 is mechanically bonded and electrically connected by an electrically conductive adhesive 18a to the bottom end of the cathode terminal 3.

Similar to the first embodiment, the capacitor element 1, the anode lead 2 and the fuse 16 are entirely covered with a rectangular parallelopiped sheathing 19 made of epoxy resin. A large part of the anode terminal 4 and a half of the cathode terminal 13 are protruding from the sheathing 19 to be bent like the letter "L" along the surface of the sheathing 19.

As shown in FIG. 3B, only the metal layer 16b of the fuse 16 is partially removed by laser trimming to adjust its electric current value. Here, two removed areas are indicated by the reference numeral 10. There is an advantage because the metal layer 16b placed at the far side of the element 1 enables the trimming process by using a laser beam after the fuse 16 is attached.

A fabrication method of the capacitor of the second embodiment is substantially the same as that of the first embodiment except that the plastic base film 16a of the fuse 16 is attached to the cathode layer 5 and that the electrically conductive adhesive 18a is applied to the metal layer 16b of the fuse 16 and the electrically conductive adhesive 18b is applied so as to partially cover the metal layer 16b thereof.

The trimming process can be carried out before a process for forming the resin sheathing 19.

What is claimed is:

1. A method of fabricating a fused chip-type solid electrolytic capacitor, comprising the steps of:

(a) forming a capacitor element having an anode lead and a cathode layer, said anode lead being implanted on a top of said element and said cathode layer being formed to cover a side face and a bottom of said element;

(b) fixing an anode terminal to said anode lead;

(c) mechanically bonding a fuse to said cathode layer;

said fuse being formed of a piece of a metallized plastic film, said metallized plastic film being formed of an electrically-insulating plastic base film and a metal layer deposited on a surface of said base film;

(d) trimming said metal layer of said fuse for adjusting its electric resistance;

(e) electrically connecting a cathode terminal through said fuse to said cathode layer;

said fuse being mechanically bonded to said cathode terminal by a first electrically conductive material and to said cathode layer by a second electrically conductive material;

said first and second electrically conductive materials having a melting temperature which is lower than a melting temperature of said metal layer;

said cathode terminal being electrically connected through said fuse to said cathode layer; and (f) forming a resin sheathing for entirely covering said capacitor element, said anode lead and said fuse and for partially covering said anode terminal and said cathode terminal;

said plastic base film of said fuse being in contact with said cathode layer;

and a bottom part of said cathode terminal being mechanically bonded and electrically connected to said metal layer by said first electrically conductive material;

and said second electrically conductive material being in contact with said cathode layer at an uncovered area of said cathode layer and with said metal layer of said fuse, so that said fuse is mechanically bonded and electrically connected to said cathode layer.

* * * * *